Nov. 11, 1952 C. J. CADWELL ET AL 2,617,142
DETACHABLE CAMERA HANDLE
Filed July 22, 1949
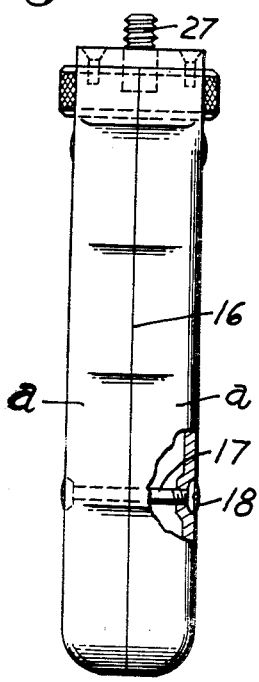
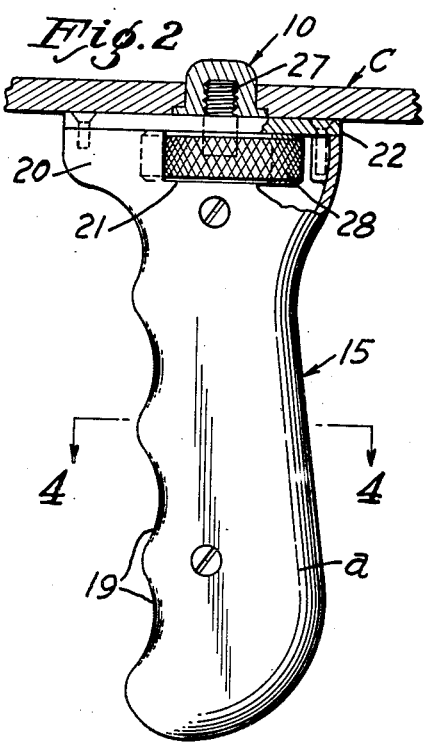
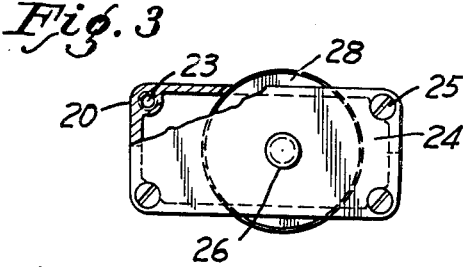
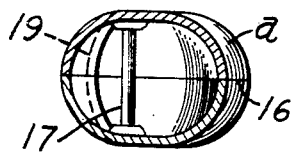
CLARENCE J. CADWELL,
FRANK M. ADAMSON,
INVENTORS,
BY Wilfred E. Lawson
ATTORNEY.

Patented Nov. 11, 1952

2,617,142

UNITED STATES PATENT OFFICE 2,617,142

DETACHABLE CAMERA HANDLE

Clarence J. Cadwell, Carpinteria, and Frank M. Adamson, Los Angeles, Calif.; said Adamson assignor to The Cadwell Corporation, Beverly Hills, Calif., a corporation of California Application July 22, 1949, Serial No. 106,186

2 Claims. (Cl. 16—114)

This invention relates generally to the class of photography and is directed particularly to improvements in handles for cameras.

The handle of the present invention is designed particularly for attachment to hand cameras in the threaded socket which is customarily provided for mounting the camera upon a tripod.

A principal object of the present invention is to provide a handle device for attachment to a camera in the manner above set forth, which is so constructed that it may be easily and quickly attached while holding the camera in one hand and gripping the handle with the other and without necessitating the turning of the handle relative to the camera or vice versa.

Another object of the invention is to provide a handle of the character stated which may be easily and quickly applied to or removed from a camera by manipulating a screw head between the thumb and forefinger of the hand holding the handle while the camera is being held in the other hand, thereby making it possible to effect the attachment of the handle or its detachment, without running the risk of dropping either.

A further object of the invention is to provide an improved handle for a camera, designed to be easily and quickly attached and detached as above set forth, which is constructed in a novel manner whereby an effective connection is established between a rotatable screw head and the handle body and, in addition, whereby an extreme lightness of the handle is obtained without sacrificing strength.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in front elevation of a handle constructed in accordance with the present invention, a portion thereof being broken away.

Figure 2 is a view in side elevation of the same, with a portion broken away at the top to show details of construction.

Figure 3 is a view looking down upon the top of the handle, with a portion of the top plate broken away.

Figure 4 is a sectional view taken substantially on the line 4—4 of Figure 2.

Referring now more particularly to the drawing the reference character C generally designates a portion of the body or box of a camera in which is fixed the usual socket nut 10 which is provided to facilitate the mounting of the camera upon a tripod by means of the usual tripod swivel screw, not shown.

The handle or hand grip of the present invention is generally designated 15 and as shown it comprises a relatively long body which is longitudinally divided along the medial line 16. The handle is accordingly formed of the two corresponding or right and left hand portions a which are in the form of hollow shells having a substantially arcuate cross section. These two shells are placed in edge to edge relation as illustrated and are connected together by transverse bolts 17, one end of each of which threads into a nut 18 as illustrated.

The handle formed by the two sections a is of hollow construction as shown and the two sections are shaped at their forward edge to have a scalloped outline whereby are provided the four recesses 19 in which each of the four fingers of a hand may position, the opposite edges of the handle sections and, consequently, the back of the handle positioning or fitting in the palm of the hand.

At the top end of each of the handle sections or parts a, such section is of increased width from front to back, providing the enlarged head portion 20, in the wall of which is formed a recess or opening 21. The top of each handle section a presents a flat top edge 22 and at the front and rear corners of each of the head portions 20 are provided the upwardly opening threaded screw sockets 23. While the handle portions or halves a are of substantially arcuate cross section, the head portions 20 are substantially rectangular and such portions when placed in side by side relation as shown in Figure 3 to form the complete head for the hand grip or handle, acquires the rectangular i. e. oblong outline shown in Figure 3.

Placed upon the top edges 22 of the two head portions of the handle is a cover plate 24 which is also of rectangular form to conform to the outline of the head of the handle and this plate is secured in place by the screws 25 each of which engages in a threaded socket 23 as shown.

The head plate 24 is provided with an opening 26 on its longitudinal center line. This opening is designed to permit the extension therethrough of the threaded stud or screw 27 which is secured to the center of a large thumb nut or wheel 28, the periphery of which is knurled as shown in Figure 2.

The recesses 21 open through the top edges of the two side portions of the handle and the peripherally knurled wheel 28 lies in these recesses as shown in Figure 3 and is maintained in position by the plate 24. The diameter of the wheel 28 is somewhat greater than the thickness of the head portion of the handle as shown so that at each side of the upper end or head portion of the handle a portion of the knurled periphery of the wheel 28 projects so that this wheel may be readily manipulated between the thumb and forefinger of the hand gripping the handle 15.

The wheel 28 lies upon the bottom edges of the recesses 21 and is maintained properly centered by the plate 24 through which the screw or threaded stud 27 projects. Thus it will be seen that the plate 24 provides, in the opening 26, the sole bearing for the stud and wheel and when the handle is to be applied to the body of the camera, the handle may be held in one hand while the camera is held in the other hand and the thumb and forefinger of the hand grasping the handle can be employed for turning the screw 27, through the medium of the wheel 28.

From the foregoing it will be readily apparent that there is provided in the present invention a novel handle device for attachment to a camera in the manner described, wherein the construction of the handle is such that its application to and removal from the camera can be effected easily and quickly and in such a manner as to reduce to a minimum the possibility of dropping either the camera or the handle.

We claim:

1. A detachable handle for a camera having a threaded socket, said detachable handle comprising an elongate body having a front longitudinal face shaped to receive the fingers of a hand grasping the body, an enlarged head at one end of the body having a flat oblong top, said head having a recess therein opening through the top and through opposite sides thereof, a wheel supported within the recess and having portions projecting through the said open sides thereof, a plate secured on the said flat top of the head over the open top of the recess retaining the wheel therein, the plate having a centrally disposed aperture therethrough, and a threaded stud secured at one end in the axial center of said wheel and projecting through the said plate aperture for engagement in said threaded socket.

2. A detachable handle of the character set forth in claim 1, wherein the said body is divided longitudinally in two parts and each of said parts is in the form of a hollow shell, means securing said shell parts together, said plate being secured at its corners to the shell parts and providing on its underface a bearing surface against which the adjacent opposing side of the wheel rotates.

CLARENCE J. CADWELL.
FRANK M. ADAMSON.

REFERENCES CITED

The following references are of record in the file of this patent:

UNITED STATES PATENTS

| Number | Name | Date |
|---|---|---|
| 626,432 | Kircher | June 6, 1899 |
| 1,754,543 | Callum | Apr. 15, 1930 |
| 1,993,485 | Paul | Mar. 5, 1935 |
| 2,096,655 | Steel | Oct. 19, 1937 |
| 2,130,262 | Burlin | Sept. 13, 1938 |